United States Patent
Kim et al.

(10) Patent No.: US 9,776,889 B2
(45) Date of Patent: Oct. 3, 2017

(54) PIPE-INTEGRATED OIL WELL FLUID OR OILFIELD FLUID SEPARATION APPARATUS, AND METHOD THEREOF

(71) Applicant: Korea Institute of Geoscience and Mineral Resources, Daejeon (KR)

(72) Inventors: Young Ju Kim, Gyeongsangnam-do (KR); Nam Seop Woo, Gyeonggi-do (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 0 days.

(21) Appl. No.: 15/305,368

(22) PCT Filed: Mar. 25, 2016

(86) PCT No.: PCT/KR2016/003066
§ 371 (c)(1),
(2) Date: Oct. 20, 2016

(87) PCT Pub. No.: WO2016/159588
PCT Pub. Date: Oct. 6, 2016

(65) Prior Publication Data
US 2017/0129783 A1    May 11, 2017

(30) Foreign Application Priority Data

Mar. 31, 2015  (KR) .................... 10-2015-0045104
Mar. 31, 2015  (KR) .................... 10-2015-0045120
Mar. 31, 2015  (KR) .................... 10-2015-0045424

(51) Int. Cl.
*C02F 1/00*     (2006.01)
*E21B 43/01*    (2006.01)
(Continued)

(52) U.S. Cl.
CPC .......... *C02F 1/008* (2013.01); *B01D 17/0217* (2013.01); *B01D 17/12* (2013.01);
(Continued)

(58) Field of Classification Search
CPC .... C02F 1/008; C02F 1/20; C02F 1/38; C02F 1/40; C02F 2101/32; C02F 2103/10;
(Continued)

(56) References Cited

U.S. PATENT DOCUMENTS 3,847,810 A * 11/1974 Tulumello ......... B01D 17/0202
                                                210/391
5,698,014 A * 12/1997 Cadle ..................... E21B 43/34
                                                166/357
(Continued)

FOREIGN PATENT DOCUMENTS

JP       2825529 B2     11/1998
JP    2003-284911 A     10/2003
(Continued)

OTHER PUBLICATIONS

Tienhaara, Mika, "Compact Separation Technology Enhances Subsea Boosting", http://www.offshore-mag.com/1/Volume-75/issue1/subsea/compact/compact-separation-technology-enhances-subsea-boosting-full.html, accessed Aug. 24, 2016.
(Continued)

*Primary Examiner* — James G Sayre
(74) *Attorney, Agent, or Firm* — Dentons US LLP

(57) ABSTRACT

Disclosed is an inline separator for separating well fluid or gas-dominant fluid using centrifugal force. The inline separator includes: an outer pipe provided with an inlet; a vortex-generating rotor installed in the outer pipe; a fixed extraction pipe having an external diameter smaller than an internal diameter of the outer pipe and installed in the outer pipe at a downstream side of the vortex-generating rotor; a
(Continued)

movable extraction pipe connected to an end of the fixed extraction pipe, close to the vortex-generating rotor, and having an extendable and retractable structure such that a position of an introduction hole of the movable extraction pipe is changeable; a pressure compensation pipe that applies pressure to oil or gas separated in a downstream end of the fixed extraction pipe; and a seawater discharge pipe connected to a portion of the outer pipe at which the fixed extraction pipe is disposed.

19 Claims, 13 Drawing Sheets

(51) Int. Cl.
| | |
|---|---|
| *B01D 17/02* | (2006.01) |
| *C02F 1/40* | (2006.01) |
| *B01D 19/00* | (2006.01) |
| *E21B 43/34* | (2006.01) |
| *E21B 43/36* | (2006.01) |
| *B01D 17/12* | (2006.01) |
| *C02F 1/20* | (2006.01) |
| *C02F 1/38* | (2006.01) |
| *C02F 101/32* | (2006.01) |
| *C02F 103/08* | (2006.01) |
| *C02F 103/10* | (2006.01) |

(52) U.S. Cl.
CPC ..... *B01D 19/0042* (2013.01); *B01D 19/0052* (2013.01); *B01D 19/0057* (2013.01); *B01D 19/0063* (2013.01); *C02F 1/20* (2013.01); *C02F 1/38* (2013.01); *C02F 1/40* (2013.01); *E21B 43/01* (2013.01); *E21B 43/34* (2013.01); *E21B 43/36* (2013.01); *C02F 2101/32* (2013.01); *C02F 2103/08* (2013.01); *C02F 2103/10* (2013.01)

(58) Field of Classification Search
CPC ............ C02F 2103/08; B01D 19/0063; B01D 17/0217; B01D 17/12; B01D 19/0042; E21B 43/01; E21B 43/36
USPC ......................................................... 166/357
See application file for complete search history.

(56) References Cited

U.S. PATENT DOCUMENTS

| | | | | |
|---|---|---|---|---|
| 7,811,344 | B1* | 10/2010 | Duke | B01D 45/16 55/337 |
| 8,235,123 | B2* | 8/2012 | Stokka | E21B 17/01 166/179 |
| 2008/0006011 | A1* | 1/2008 | Larnholm | B01D 17/0217 55/421 |
| 2009/0211763 | A1* | 8/2009 | Fowler | B01D 19/0057 166/357 |

FOREIGN PATENT DOCUMENTS

| | | |
|---|---|---|
| KR | 10-1999-0063991 A | 7/1999 |
| KR | 10-2001-0018498 A | 3/2001 |
| KR | 10-1206938 B1 | 11/2012 |
| KR | 10-2014-0129514 | 11/2014 |

OTHER PUBLICATIONS

PCT International Search Report issued in connection with related PCT Application No. PCT/KR2016/003066 dated Jun. 24, 2016.

* cited by examiner

US 9,776,889 B2

PIPE-INTEGRATED OIL WELL FLUID OR OILFIELD FLUID SEPARATION APPARATUS, AND METHOD THEREOF

CROSS-REFERENCE TO RELATED APPLICATION

This application is the Section 371 National Stage of PCT/KR2016/003066 filed Mar. 25, 2016, the entirety of which is incorporated herein by reference to the extent permitted by law. This application claims priority to Korean Patent Application Nos. KR 10-2015-0045104, KR 10-2015-0045120 and KR 10-2015-0045424 filed on Mar. 31, 2015 and all the benefits accruing therefrom under 35 U.S.C. §119, the contents of which are incorporated by reference in their entirety.

TECHNICAL FIELD

The present invention relates to an apparatus for extracting oil or gas from a seabed. More specifically, the present invention relates to an inline separator and method for separating oil-seawater mixed fluid (hereinafter, referred to as "well fluid") or gas-seawater mixed fluid (hereinafter, referred to as "gas-dominant fluid"), wherein the separator and method first receives well fluid or gas-dominant fluid and separates it into oil or gas and seawater using centrifugal force.

BACKGROUND ART

Generally, for exploration and extraction of subsea oil or gas, fixed or floating drill ships or drilling rigs are used. Jack-up barges and jackets are fixed production platforms, and semi-submersible drilling rigs, tension-leg platforms, and SPARs are floating production platforms.

As oil that lies in land is becoming exhausted, the exploration and drilling depth is becoming deeper. Further, fixed production platforms have difficulty in coping with deepwater exploration and drilling. Therefore, floating production platforms are mainly used around the world these days. Especially, SPARs are the most prevalent subsea oil exploration and production platforms among the floating production platforms.

Conventionally, overall processing for oil extracted in a shallow water area is performed in facilities on a platform deck. Specifically, Korean Patent Application Publication No. 10-2014-0129514 (published on Nov. 7, 2014; Patent Document 1) discloses an oil and gas production system using a low-pressure separator. The oil and gas production system is equipped with a low-pressure separator and an oil storage tank both of which are submerged. The oil and gas production system extracts well fluid or gas-dominant fluid from a seabed, separates the fluid into a water component, an oil component, and a gas component using the submerged low-pressure separator, and stores the separated oil component in the submerged oil storage tank. That is, this oil and gas production system performs fluid or gas-dominant fluid separation in deep water.

However, the submerged low-pressure separator has a disadvantage of low separation speed because well fluid or gas-dominant fluid is introduced into the low-pressure separator and then separated into oil, gas, and water by buoyancy attributed to density difference.

To solve this problem, the periodic publication "OFFSHORE" discloses an inline gas-liquid separator that swirls a fluid, which is a mixture of seawater and oil or gas, in a pipeline, thereby separating the fluid using density difference between seawater and oil or gas. FIG. 1 is a view illustrating a conventional gas-liquid separator.

REFERENCE http://www.offshore-mag.com/1/volume-75/issue-1/subsea/compact/compact-separation-technology-enhances-subsea-boosting-full.html As illustrated in FIG. 1, the conventional inline separator 1 for separating well fluid or gas-dominant fluid is structured such that a vortex-generating rotor 14, a fixed extraction pipe 18, and a pressure compensation pipe 21 provided with a discharge hole 22 are arranged in this order within an outer pipe 13 provided with an inlet 12 equipped with a diffuser 11, wherein the vortex-generating rotor 14 is rotatably fixed in the outer pipe 13 by a vortex-generating rotor fixing bracket 15 and an extraction pipe rotor 19 is fixedly installed in the fixed extraction pipe 18 by an extraction pipe fixing bracket 17, wherein a seawater discharge pipe 16 is connected to a portion of the outer pipe 13, which is close to the extraction pipe 18, and wherein a channel is formed between an inner surface of the outer pipe 13 and an outer surface of the extraction pipe 18 such that seawater can flow through the channel formed between the inner surface of the outer pipe 13 and the outer surface of the extraction pipe 18.

When the inline separator 1 for separating well fluid or gas-dominant fluid receives well fluid or gas-dominant fluid through the inlet 12 of the outer pipe, the vortex-generating rotor 14 swirls the well fluid or gas-dominant fluid introduced into the outer pipe 13, thereby forming a vortex of well fluid or gas-dominant fluid. At this point, a low density fluid such as oil or gas forms a low density fluid vortex 50 at the center of the vortex of well fluid or gas-dominant fluid. On the other hand, a high density fluid such as seawater forms a high density fluid vortex 60 that is present outside the low density fluid vortex 50 due to centrifugal force. Therefore, the low density fluid vortex 50 is extracted through the extraction pipe 18 and accelerated by the extraction pipe rotor 19 installed in the extraction pipe 18. Then, the low density fluid vortex 50 gains pressure while passing through the pressure compensating pipe 21, moves through a pipeline connected to the discharge hole 22, and is finally stored in a gas tank or an oil tank in a drilling facility. The high density fluid vortex 60 flows through the channel formed between the outer pipe 13 and the extraction pipe 18 and is discharged through the seawater discharge pipe 16. In this way, oil or gas and seawater are separated from each other.

According to the conventional inline separator 1 for separating well fluid or gas-dominant fluid, the separator has an inline structure and is submerged. Therefore, it simplifies topside facilities on a deck of a drill ship and increases an amount of oil or gas extracted, thereby dramatically improving drilling efficiency of subsea resources.

However, the above-described conventional art has the following problem. That is, when the well fluid or gas-dominant fluid is swirled, the diameter of the funnel-shaped low density fluid vortex 50 varies in accordance with a ratio of oil or gas to seawater and the distance to the extraction pipe 18. Therefore, when the diameter of the low density fluid vortex 50 does not correspond to the internal diameter of the extraction pipe 18, seawater is remixed with the separated oil or gas, or the separated oil or gas is discharged through the seawater discharge pipe 16, resulting in deterioration in an oil or gas production rate.

DISCLOSURE

Technical Problem

The present invention has been made keeping in mind the above problems occurring in the prior art, and an object of the present invention is to provide an inline separator or method for separating oil or gas from well fluid or gas-dominant fluid, equipped with or involving a movable extraction pipe, and capable of assuring separation of oil or gas and seawater while preventing separated oil or gas from being remixed with seawater, regardless of a mixing ratio of oil or gas to seawater in the well fluid or gas-dominant fluid by moving an introduction hole of an extraction pipe to such a position that a diameter of a vortex of a low density fluid corresponds to a diameter of the introduction hole of the extraction pipe.

Another object of the present invention is to provide an inline separator or method for separating well fluid or gas-dominant fluid, equipped with or involving a movable extraction pipe, and capable of dramatically improving separation efficiency of oil or gas and seawater by facilitating formation of a vortex of well fluid or gas-dominant fluid.

A further object of the present invention is to provide an inline separator or method for separating well fluid or gas-dominant fluid, equipped with or involving a multi-level movable extraction pipe, and capable of assuring separation of oil or gas and seawater while preventing separated oil or gas from being remixed with seawater regardless of a mixing ratio of oil or gas to seawater in the well fluid or gas-dominant fluid by moving an introduction hole of an extraction pipe to such a position that a diameter of a vortex of a low density fluid corresponds to a diameter of the introduction hole of the extraction pipe.

A further object of the present invention is to provide an inline separator or method for separating well fluid or gas-dominant fluid, equipped with or involving a multi-level movable extraction pipe, and capable of dramatically improving separation efficiency by facilitating formation of a vortex of well fluid or gas-dominant fluid.

A further object of the present invention is to provide an inline separator or method for separating well fluid or gas-dominant fluid, equipped with or involving a diameter-adjustable pipe, and capable of separating the well fluid or gas-dominant fluid into oil or gas and seawater while preventing separated oil or gas from being remixed with seawater by moving an introduction hole of an extraction pipe to such a position that a diameter of a vortex of a low density fluid corresponds to a diameter of the introduction hole of the extraction pipe.

A further object of the present invention is to provide an inline separator or method for separating well fluid or gas-dominant fluid into oil or gas and seawater, equipped with or involving a diameter-adjustable pipe, and capable of dramatically improving separation efficiency by facilitating formation of a vortex of the well fluid or gas-dominant fluid.

Technical Solution

In order to accomplish the objects of the present invention, according to one aspect, there is provided an inline separator for separating well fluid or gas-dominant fluid, the separator including: an outer pipe provided with an inlet; a vortex-generating rotor that is installed in the outer pipe to be close to the inlet; a movable extraction pipe having an external diameter smaller than an internal diameter of the outer pipe and movably installed in the outer pipe at a downstream side of the vortex-generating rotor; a pressure compensation pipe that applies pressure to oil or gas separated by the movable extraction pipe to discharge the separated oil or gas and is connected to the movable extraction pipe such that a downstream end of the movable extraction pipe is extendable therefrom and retractable thereinto; and a seawater discharge pipe connected to a portion of the outer pipe, close to the movable extraction pipe.

The inline separator further includes a low density fluid vortex diameter detection unit installed at a downstream side of the vortex-generating rotor to detect the diameter of the vortex of the low density fluid.

The inline separator further includes: a pipe driving unit that moves the movable extraction pipe, in accordance with the diameter of the vortex of the low density fluid detected by the low density fluid vortex diameter detection unit, to such a position that the vortex of the low density fluid has a diameter corresponding to the diameter of the introduction hole of the movable extraction pipe; and rails that guide movement of the movable extraction pipe attributed to force supplied by the pipe driving unit.

The inline separator further includes an extraction pipe rotor installed in the movable extraction pipe to enhance a vortex of separated oil or gas.

The inline separator further includes a steel wire installed on inner surfaces of the outer pipe and the movable extraction pipe, thereby causing a vortex.

In order to accomplish the objects of the present invention, according to another aspect, there is provided a method for separating well fluid or gas-dominant fluid, using an inline separator for separating well fluid or gas-dominant fluid, wherein the separator includes: a movable extraction pipe that is movably installed in an outer pipe and spaced from an inner surface of the outer pipe in which a vortex-generating rotor and a low density fluid vortex diameter detection unit are installed; and a pipe driving unit for moving the movable extraction pipe, wherein the method includes: a position detection step of detecting a position of a diameter of a vortex of a low density fluid, corresponding to a diameter of an introduction hole of the movable extraction pipe, by using a low density fluid vortex diameter detection unit, when the vortex of the low density fluid is formed at an upstream side of the movable extraction pipe by the vortex-generating rotor; and a pipe moving step of moving the movable extraction pipe, by using the pipe driving unit, to such a position that the vortex of the low density fluid has a diameter corresponding to the diameter of the introduction hole of the movable extraction pipe.

In order to accomplish the objects of the present invention, according to a further aspect, there is provided an inline separator for separating well fluid or gas-dominant fluid, including: an outer pipe provided with an inlet; a vortex-generating rotor installed in the outer pipe to be close to the inlet; a fixed extraction pipe having an external diameter smaller than an internal diameter of the outer pipe and installed in the outer pipe at a downstream side of the vortex-generating rotor; a multi-level movable extraction pipe that is extendable from and retractable into an end of the fixed extraction pipe, close to the vortex-generating rotor, thereby changing a position of the introduction hole; a pressure compensation pipe that applies pressure to oil or gas separated at a downstream side of the fixed extraction pipe to discharge the separated oil or gas; and a seawater discharge pipe connected to a portion of the outer pipe, at which the fixed extraction pipe is disposed.

The inline separator may further include a low density fluid vortex diameter detection unit that is installed at a downstream side of the vortex-generating unit and detects a diameter of a vortex of a low density fluid.

The inline separator may further include: a pipe driving unit for moving the multi-level movable extraction pipe, in accordance with the diameter of the vortex of the low density fluid detected by the low density fluid vortex diameter detection unit, to such a position that a diameter of the introduction hole of the multi-level movable extraction pipe corresponds to the diameter of the vortex of the low density fluid; and a driving rod for moving the multi-level movable extraction pipe using force supplied by the pipe driving unit.

The inline separator may further include an extraction pipe rotor that is installed in the fixed extraction pipe and enhances a vortex of the separated oil or gas.

The inline separator may further include a steel wire installed on inner surfaces of the outer pipe, the fixed extraction pipe, and the multi-level movable extraction pipe to cause a vortex.

In order to accomplish the objects of the present invention, there is provided a method for separating well fluid or gas-dominant fluid using an inline separator for separating well fluid or gas-dominant fluid into oil or gas and seawater wherein the inline separator includes: a multi-level movable extraction pipe that is installed in an outer pipe in which a vortex-generating rotor and a flow density fluid vortex diameter detection unit are installed and is spaced from an inner surface of the outer pipe; a fixed extraction pipe; a pipe driving unit for moving the multi-level movable extraction pipe; and a driving rod, thereby separating oil or gas from the well fluid or gas-dominant fluid introduced into the outer pipe, wherein the method includes: a position detection step of detecting a position of a diameter of a vortex of a low density fluid corresponding to a diameter of an introduction hole of the multi-level movable extraction pipe by using the low density fluid vortex diameter detection unit when the vortex of the low density fluid is formed by the vortex-generating rotor at an upstream side of the multi-level movable extraction pipe within the outer pipe; and a pipe moving step of moving the multi-level movable extraction pipe using the pipe driving unit and the driving rod such that the introduction hole of the multi-level movable extraction pipe is disposed at the detected position at which the vortex of the low density fluid has a diameter corresponding to the diameter of the introduction hole of the multi-level movable extraction pipe.

In order to accomplish the objects of the present invention, according to a further aspect, there is provided an inline separator for separating well fluid or gas-dominant fluid, the inline separator including: an outer pipe provided with an inlet; a vortex-generating rotor installed in the outer pipe to be close to the inlet; a fixed extraction pipe having an external diameter smaller than an internal diameter of the outer pipe and installed in the outer pipe at a downstream side of the vortex-generating rotor; a diameter-adjustable pipe installed at an end of the fixed extraction pipe, close to the vortex-generating rotor; a pressure compensation pipe that applies pressure to oil or gas separated in a downstream portion of the fixed movable pipe to discharge the separated oil or gas; and a seawater discharge pipe connected to a portion of the outer pipe, at which the fixed extraction pipe is disposed.

The inline separator further includes a low density fluid vortex diameter detection unit that is installed at the downstream side of the vortex-generating rotor and detects a diameter of a vortex of a low density fluid.

The diameter-adjustable pipe is installed such that an end of the diameter-adjustable pipe is hinged to the end of the fixed extraction pipe, close to the vortex-generating rotor, and is provided with a plurality of blades combined with each other in a partially superimposed manner, so that the diameter of the end of the diameter-adjustable pipe is adjustable in a manner that movement of any one blade causes the plurality of blades to move in the same direction.

The inline separator further includes: a pipe driving unit that adjusts the diameter of the diameter-adjustable pipe in accordance with the diameter of the vortex of the low density fluid detected by the low density fluid vortex diameter detection unit; and a driving rod that adjusts the diameter of the diameter-adjustable pipe using force supplied by the pipe driving unit.

The inline separator further includes an extraction pipe rotor that enhances a vortex of separated oil or gas and is installed in the fixed extraction pipe.

The inline separator further includes a steel wire installed on inner surfaces of the outer pipe, fixed extraction pipe, and diameter-adjustable pipe to cause a vortex.

In order to achieve the objects of the present invention, according to a further aspect, there is provided a method for separating well fluid or gas-dominant fluid using an inline separator for separating well fluid or gas-dominant fluid, wherein the inline separator includes: an outer pipe in which a vortex-generating rotor and a low density fluid vortex diameter detection unit are installed; a diameter-adjustable pipe installed in the outer pipe to be spaced from an inner surface of the outer pipe; a fixed extraction pipe; and a pipe driving unit and a driving rod for adjusting a diameter of the diameter-adjustable pipe, thereby separating oil or gas and seawater from the well fluid or gas-dominant fluid, wherein the method includes: a position detection step of detecting a position of a diameter of a vortex of a low density fluid corresponding to a diameter of an introduction hole of the diameter-adjustable pipe, using the low density fluid vortex diameter detection unit when the vortex-generating rotor creates the vortex of the low density fluid at a downstream side of the diameter-adjustable pipe in the outer pipe; and a pipe diameter adjusting step of adjusting the diameter of the diameter-adjustable pipe using the pipe driving unit and the driving rod such that the diameter of the diameter-adjustable pipe corresponds to the diameter of the vortex of the low density fluid.

Advantageous Effects

The inline separator and method for separating well fluid or gas-dominant fluid, equipped with a movable extraction pipe, according to the present invention has an advantage of dramatically increasing oil or gas extraction efficiency by moving the movable extraction pipe because a diameter of a vortex of a low density fluid and a diameter of a vortex of a high density fluid vary in accordance with a mixing ratio of oil or gas to seawater.

In addition, the present invention has the advantage of dramatically increasing separation efficiency of oil or gas by facilitating formation of a vortex of well fluid.

In addition, the present invention has the advantage of dramatically increasing extraction efficiency of oil or gas from subsea resources by actively coping with a phenomenon in which a diameter of a vortex of a low density fluid and a diameter of a vortex of a high density fluid vary in accordance with a mixing ratio of oil or gas to seawater.

In addition, the present invention has the advantage of dramatically increasing extraction efficiency of oil or gas from subsea resources by adjusting a diameter of a diameter-adjustable pipe in accordance with a mixing ratio of oil or gas to seawater because a diameter of a vortex of a low density liquid and a diameter of a vortex of a high density liquid vary in accordance with the mixing ratio.

BEST MODE

Figure 1:
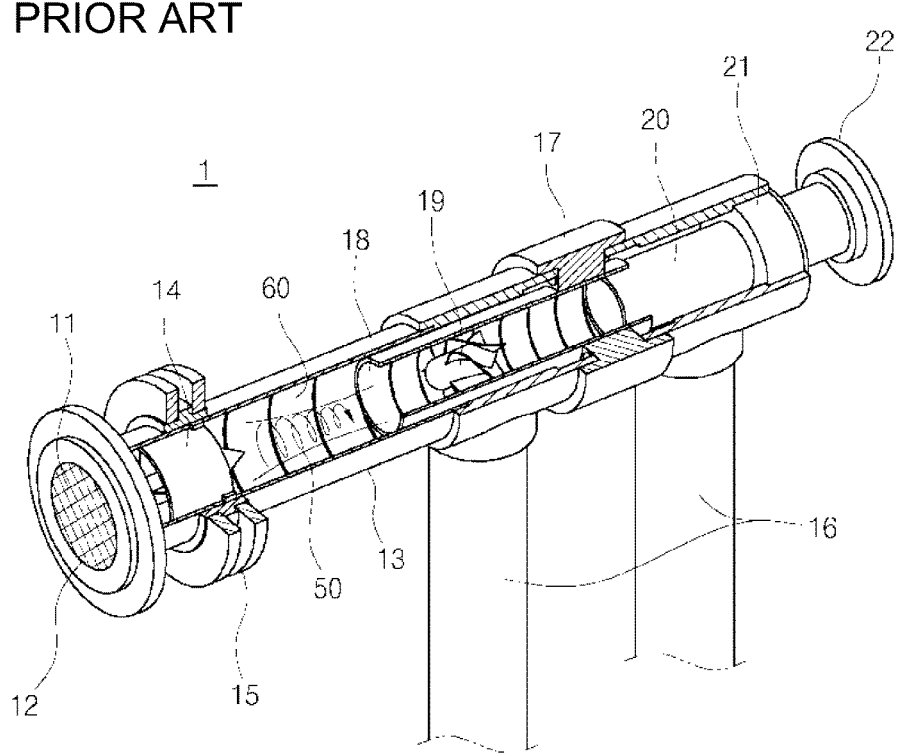
FIG. 1 is a view illustrating a conventional inline separator 1 for separating well fluid or gas-dominant fluid, equipped with a movable extraction pipe.

Hereinafter, preferred embodiments of the present invention will be described with reference to the accompanying drawings.

In the following description of the present invention, detailed descriptions of known functions and components incorporated herein will be omitted when it may make the subject matter of the present invention unclear. In addition, the same reference numerals throughout the drawings denote elements having the same or similar function.

Reference will now be made in detail to various embodiments of the present invention, specific examples of which are illustrated in the accompanying drawings and described below, since the embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Figure 2:
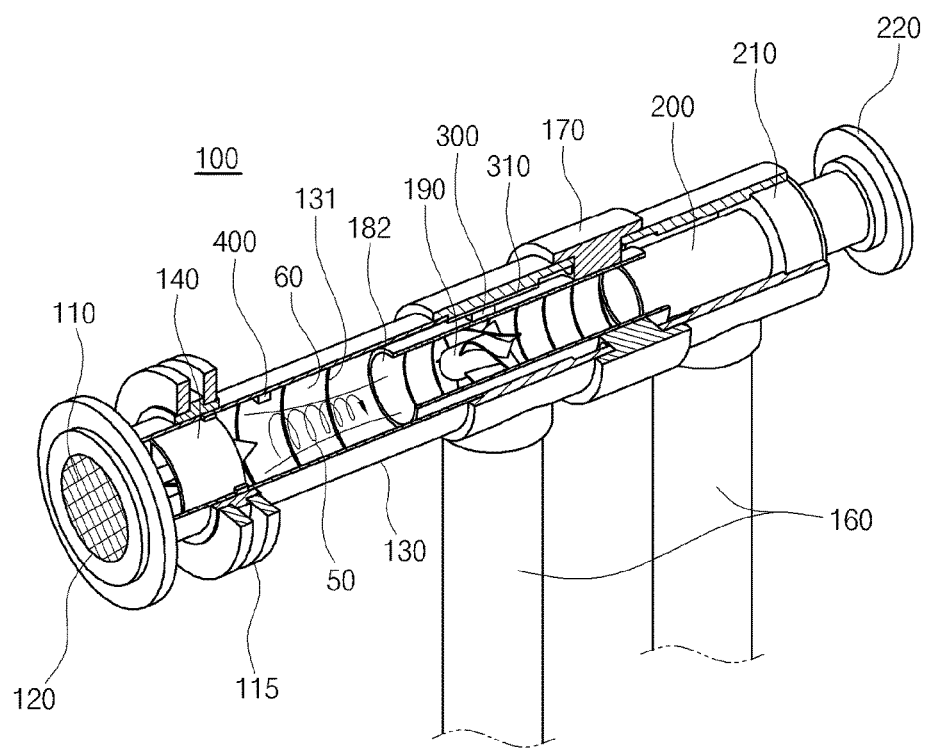
FIG. 2 is a cut-away perspective view of an inline separator 100 for separating well fluid or gas-dominant fluid, equipped with a movable extraction pipe, according to a first embodiment of the present invention.

FIG. 2 is a cut-away perspective view illustrating an inline separator 100 for separating well fluid or gas-dominant fluid, equipped with a movable extraction pipe, according to a first embodiment of the present invention.

As illustrated in FIG. 2, the inline separator 100 for separating well fluid or gas-dominant fluid, equipped with the movable extraction pipe includes: an outer pipe 130 provided with an inlet 120 equipped with a diffuser 110; a vortex-generating rotor 140 that is rotatably fixed in the outer pipe 130 by a vortex-generating rotor fixing bracket 115; a movable extraction pipe 182 in which an extraction pipe rotor 190 is movably installed by an extraction pipe fixing bracket 170; and a pressure compensation pipe 200 provided with a pressure compensator 210 and a discharge hole 220 and connected in an extendable manner to a downstream end of the movable extraction pipe 182, wherein a seawater discharge pipe 160 is connected to a portion of the outer pipe 130, at which the movable extraction pipe 182 is disposed, and there is a channel between an inner surface of the outer pipe 130 and an outer surface of the movable extraction pipe 182 such that seawater moves through the channel.

The diffuser 110 uniformly diffuses well fluid or gas-dominant fluid introduced into the outer pipe 130 so that the well fluid or gas-dominant fluid can form a uniform vortex in the outer pipe 130. The diffuser 110 may be a lattice structure like a honeycomb structure.

The pressure compensation pipe 200 applies pressure to separated oil or gas such that the separated oil or gas can be transported to a storage tank installed in a drill ship.

A pipe driving unit 300 and rails 310 are installed in the outer pipe 130. The pipe driving unit 300 moves the movable extraction pipe 182 toward the pressure compensation pipe 200. The rails 310 guide movement of the movable extraction pipe 182 in accordance with driving force of the pipe driving unit 300.

In addition, a helical steel wire is installed in the outer pipe 130 and the movable extraction pipe 182 to cause a vortex. A portion of the helical steel wire installed in the outer pipe 130 is referred to as "outer pipe steel wire" 131 and a portion of the helical steel wire installed in the movable extraction pipe 182 is referred to as "movable extraction pipe steel wire" 183.

A low density fluid vortex diameter detection unit 400 to detect a diameter of a vortex of a low density fluid is installed in the outer pipe 130 at a downstream side of the vortex-generating rotor 140. The low density fluid vortex diameter detection unit 400 is structured to move in the lengthwise direction of the outer pipe 130, thereby detecting diameters of the vortex of the low density fluid 50 having a funnel shape, at different positions in the lengthwise direction of the outer pipe 130 and outputting the detected diameters to the pipe driving unit 300. The low density fluid vortex diameter detection unit 400 may use a mirror detection system or an ultrasonic detection system.

In the mirror detection system, a vortex of fluid causes changes in pressure applied to the surfaces of thin metallic mirrors disposed at respective sides of a vortex generator through pressure directing holes, thereby causing vibrations of the metallic mirrors. Light-emitting devices are installed to be close to the respective vibrating mirrors, and light reflected from the vibrating mirrors is detected as a signal. The mirror detection system detects a vortex of fluid in this way.

The ultrasonic detection system continuously receives ultrasonic waves using changes in air density attributed to a vortex. This system detects the frequency of vortexes by detecting the number of signals scattered due to the density differences.

The inline separator 100 for separating well fluid or gas-dominant fluid, having the structure described above, first receives well fluid (a mixture of oil and seawater) or gas-dominant fluid (a mixture of gas and seawater) through the inlet 120 and forms a vortex by rotating the vortex-generating rotor 140. At this point, a low density fluid, such as oil or gas, forms a low density fluid vortex 50 at the center of the vortex of fluid. On the other hand, a high density fluid, such as seawater, forms a high density fluid vortex 60 outside the low density fluid vortex 50.

Therefore, the low density fluid vortex 50 is extracted through the movable extraction pipe 182 and accelerated by the extraction pipe rotor 190. Then, the low density fluid vortex 50 gains pressure while passing through the pressure compensating pipe 200. Next, the low density fluid vortex 50 is transferred to a gas tank or an oil tank of a drilling facility through a pipeline connected to the discharge hole 220. Thus, the low density fluid is finally stored in the gas tank or oil tank. On the other hand, the high density fluid vortex 60 is discharged through the channel between the outer pipe 130 and the movable extraction pipe 182 and then through the seawater discharge pipe 160. In this way, oil or gas and seawater are separated.

In the process of separating well fluid or gas-dominant fluid, the diameter of the low density fluid vortex 50 and the diameter of the high density fluid vortex 60 vary in accordance with a mixing ratio of oil or gas to seawater. Therefore, when the internal diameter of the introduction hole of the movable extraction pipe 182 differs from the diameter of the low density fluid vortex 50 at the position near the introduction hole, separation efficiency is lowered. Specifically, when the internal diameter of the introduction hole of the movable extraction pipe 182 is larger than the diameter of the low density fluid vortex 50 at the position near the introduction hole, some seawater is likely to be mixed in separated oil or gas. Conversely, when the internal diameter of the introduction hole of the movable extraction pipe 182 is smaller than the diameter of the low density fluid vortex 50 at the position near the introduction hole, a portion of separated oil or gas is likely to be discharged outside the movable extraction pipe 182, resulting in a decrease in separation efficiency.

Therefore, an object of the present invention is to prevent oil or gas that is obtained through a separation method using an inline separator, from being lost or leaking or to prevent seawater from remaining in the oil or gas produced through the separation method.

Figure 3:
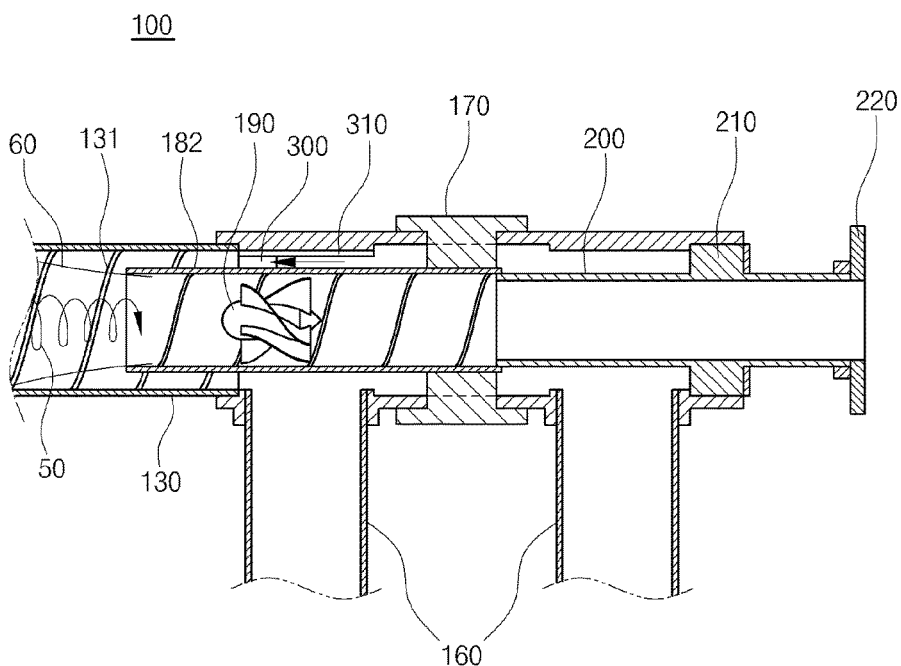
FIG. 3 is a view illustrating a state in which the movable extraction pipe 182 is moved toward a vortex-generating rotor 140 to cope with a decreased diameter of a vortex of a low density fluid (hereinafter, also referred to as low density fluid vortex) 50 such that an introduction hole of the movable extraction pipe 182 is disposed at a position where the vortex of the low density fluid 50 has a diameter corresponding to an internal diameter of the introduction hole of the movable extraction pipe 182.
Figure 4:
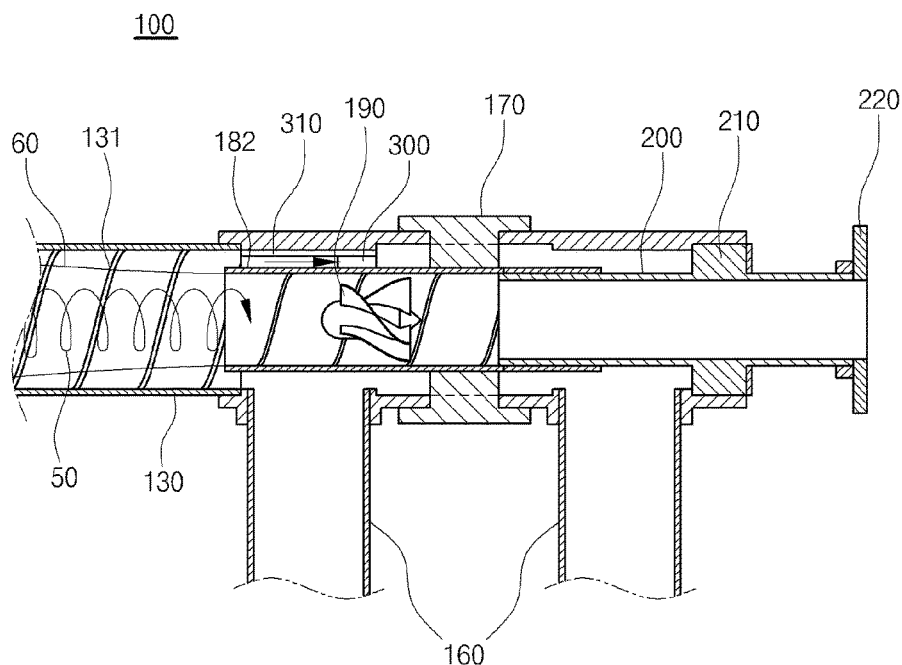
FIG. 4 is a view illustrating a state in which the movable extraction pipe 182 is moved toward a pressure compensation pipe 200 to cope with an increased diameter of the low density fluid vortex 50 such that the introduction hole of the movable extraction pipe 182 is disposed at a position where the vortex of the low density fluid 50 has a diameter corresponding to an internal diameter of the introduction hole of the movable extraction pipe 182.
Figure 5:
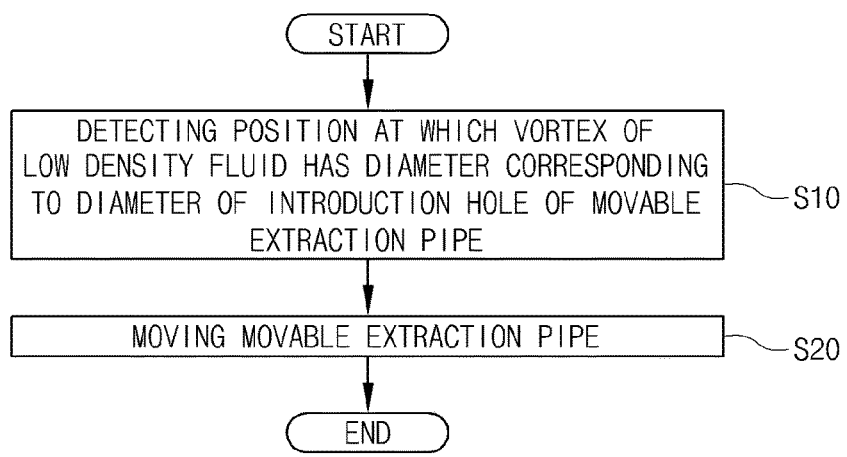
FIG. 5 is a flowchart sequentially describing a method for separating well fluid or gas-dominant fluid using the inline separator for separating well fluid or gas-dominant fluid, equipped with the movable extraction pipe, according to the first embodiment of the present invention.

FIG. 3 is a view illustrating a state in which the movable extraction pipe 182 is extended from the pressure compensation pipe 200 to cope with a decreased diameter of the low density fluid vortex 50, so that the introduction hole of the movable extraction pipe 182 is moved to such a position that the low density fluid vortex 50 has a diameter corresponding to the internal diameter of the introduction hole of the movable extraction pipe 182. FIG. 4 is a view illustrating a state in which the movable extraction pipe 182 is retracted into the pressure compensation pipe 200 such that the introduction hole of the movable extraction pipe 182 may be disposed at a position where the low density fluid vortex 50 has a diameter corresponding to the internal diameter of the introduction hole of the movable extraction pipe 182. FIG. 5 is a flowchart describing a method of separating well fluid or gas-dominant fluid using the inline separator according to the first embodiment of the present invention.

With reference to FIGS. 3 to 5, a method for separating well fluid or gas-dominant fluid will be described in detail.

First, as illustrated in FIG. 3, when well fluid or gas-dominant fluid is introduced into the outer pipe 130, a vortex of the incoming fluid is formed at an upstream side of the movable extraction pipe 182 in the outer pipe 130 due to rotation of the vortex-generating rotor 140. At this point, the low density fluid vortex 50 such as a vortex of oil or gas is present at the center portion of the vortex, and the high density fluid vortex 60 such as a vortex of seawater is formed outside the low density fluid vortex 50.

After the vortexes are formed as described above, the low density fluid vortex diameter detection unit 400 performs a position detection step S10 in which the low density fluid vortex diameter detection unit 400 detects a position of a portion of the low density fluid vortex 50, having a diameter corresponding to an internal diameter of the introduction hole of the movable extraction pipe 182.

Next, after the position detection step S10 is performed, a pipe moving step S20 is performed in which the movable extraction pipe 182 is moved such that the introduction hole of the movable extraction pipe 182 can be disposed at a position where the low density fluid vortex 50 has a diameter corresponding to the internal diameter of the introduction hole of the movable extraction pipe 182.

When the detection results of the position detection step S10 indicate that the internal diameter of the introduction hole of the movable extraction pipe 182 is larger than the diameter of the low density fluid vortex 50 detected at the position near the introduction hole of the movable extraction pipe 182, as illustrated in FIG. 3, the pipe moving step S20 becomes a process in which the pipe driving unit 400 moves the movable extraction pipe 182 toward the vortex-generating rotor 140 so that the movable extraction pipe 182 is further extended from the pressure compensation pipe 200 and thus the introduction hole of the movable extraction pipe 182 is disposed at a position where the low density fluid vortex has a diameter corresponding to the internal diameter of the introduction hole of the movable extraction pipe 182.

Conversely, when the results indicate that the internal diameter of the movable extraction pipe 182 is smaller than the diameter of the low density fluid vortex 50 detected at the position near the introduction hole, as illustrated in FIG. 4, a retraction process is performed. That is, the pipe driving unit 400 causes the introduction hole of the movable extraction pipe 182 to move away from the vortex-generating rotor 140 such that the introduction hole of the movable extraction pipe 182 can be disposed at a position where the low density fluid vortex has a diameter corresponding to the internal diameter of the introduction hole of the movable extraction pipe 182.

Figure 6:
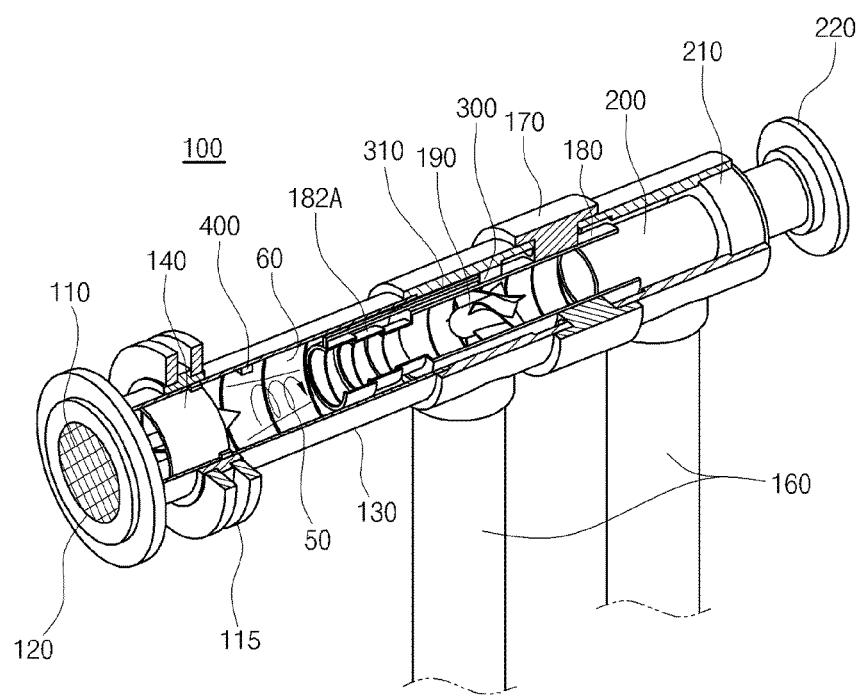
FIG. 6 is a cut-away perspective view illustrating an inline separator for separating well fluid or gas-dominant fluid according to a second embodiment of the present invention.

FIG. 6 is a cut-away perspective view of an inline separator for separating well fluid or gas-dominant fluid according to a second embodiment of the present invention.

As illustrated in FIG. 6, the inline separator 100 for separating well fluid or gas-dominant fluid includes an outer pipe 130, a vortex-generating rotor 140, a fixed extraction pipe 180, a multi-level movable extraction pipe 182A, and a pressure compensation pipe 200 all of which are arranged in this order. The outer pipe 130 is provided with an inlet 120 equipped with a diffuser 110. The vortex-generating rotor 140 is installed in the outer pipe 130 and rotatably fixed by a vortex-generating rotor fixing bracket 115. The fixed extraction pipe 180 is fixed by an extraction pipe fixing bracket 170 and equipped with an extraction pipe rotor 190 installed therein. The multi-level movable extraction pipe 182A is connected to an end of the fixed extraction pipe 180, close to the vortex-generating rotor 140, in an extendable and retractable manner such that a position of an introduction hole thereof is changeable. The pressure compensation pipe 200 is provided with a pressure compensator 210 and a discharge hole 220. A seawater discharge pipe 160 is connected to a portion of the outer pipe 130 where the fixed extraction pipe 180 is disposed. There is a channel formed between an inner surface of the outer pipe 130 and an outer surface of the fixed extraction pipe 180 so that seawater can move through the channel.

The multi-level movable extraction pipe 182A is structured such that two or more pipes 182a, 182b, and 182c are extendably and retractably combined with each other like a telescopic pipe.

The diffuser 110 uniformly diffuses the well fluid or gas-dominant fluid introduced into the outer pipe 130 so that a uniform vortex can be formed in the outer pipe 130. The diffuser 110 may have a lattice structure such as a honeycomb structure.

The pressure compensation pipe 200 applies pressure to separated oil or gas so that the separated oil or gas can be easily transported to a storage tank in a drill ship on the sea.

In the outer pipe 130, a pipe driving unit 300 and a driving rod 310 are installed. The pipe driving unit 300 changes a relative position of the multi-level movable extraction pipe 182A with respect to the fixed extraction pipe 180. The driving rod 310 connects the pipe driving unit 300 and the multi-level movable extraction pipe 182A to each other, thereby transferring driving force of the pipe driving unit 300 to the multi-level movable extraction pipe 182A.

A helical steel wire is installed on inner surfaces of the outer pipe 130, the fixed extraction pipe 180, and the multi-level movable extraction pipe 182A to cause a vortex of well fluid or gas-dominant fluid. A portion of the helical steel wire disposed in the outer pipe 130 is referred to as "outer pipe steel wire" 131, a portion of the helical steel wire disposed in the fixed extraction pipe 180 is referred to as "fixed extraction pipe steel wire" 181, and a portion of the helical steel wire disposed in the multi-level movable extraction pipe 182A is referred to as "multi-level extraction pipe steel wire" 183a.

In addition, a low density fluid vortex diameter detection unit 400 for detecting a diameter of a vortex of a low density fluid (hereinafter, referred to as a low density fluid vortex) is installed in the outer pipe at a downstream side of the vortex-generating rotor 140. The low density fluid vortex diameter detection unit 400 is installed to move in the outer pipe 130 in a lengthwise direction of the outer pipe 130. Thus, the low density fluid vortex diameter detection unit 400 detects diameters of a funnel-shaped low density fluid vortex 50 at different positions in the lengthwise direction and outputs the detected diameters to the pipe driving unit 300. The low density fluid vortex diameter detection unit 400 may use a mirror detection system or an ultrasonic detection system.

In the mirror detection system, a vortex of fluid causes changes in pressure applied to the surfaces of thin metallic mirrors disposed at respective sides of a vortex generator through pressure directing holes, thereby causing vibrations of the metallic mirrors. Light-emitting devices are installed to be close to the respective vibrating mirrors, and light reflected from the vibrating mirrors is detected as a signal. The mirror detection system detects a vortex of fluid in this way.

The ultrasonic detection system continuously receives ultrasonic waves using changes in air density attributed to a vortex. This system detects the frequency of vortexes by detecting the number of signals scattered due to the density differences.

The inline separator 100 for separating well fluid or gas-dominant fluid, having the structure described above, first receives well fluid (a mixture of oil and seawater) or gas-dominant fluid (a mixture of gas and seawater) through the inlet 120 and forms a vortex by rotating the vortex-generating rotor 140. At this point, a low density fluid with low density, such as oil or gas, forms a low density fluid vortex 50 at the center. On the other hand, a high density fluid with high density, such as seawater, forms a high density fluid vortex 60 outside the low density fluid vortex 50 due to centrifugal force.

Therefore, the low density fluid vortex 50 is extracted through the fixed extraction pipe 180 and accelerated by the extraction pipe rotor 190 installed in the extraction pipe 180. Then, the low density fluid vortex 50 gains pressure while passing through the pressure compensating pipe 200. Next, the low density fluid vortex 50 is transferred to a gas tank or an oil tank of a drilling facility through a pipeline connected to the discharge hole 220. Thus, the low density fluid is finally stored in the gas tank or oil tank. On the other hand, the high density fluid vortex 60 is discharged through the channel between the outer pipe 13 and the extraction pipe 18 and then through the seawater discharge pipe 16. In this way, oil or gas and seawater are separated.

In the process of separating well fluid or gas-dominant fluid, diameters of the low density fluid vortex 50 and the high density fluid vortex 60 vary in accordance with a mixing ratio of oil or gas to seawater. Therefore, when an internal diameter of an introduction hole of the multi-level movable extraction pipe 182A differs from a diameter of the low density fluid vortex 50 detected a position near the introduction hole of the multi-level movable extraction pipe 182A, separation efficiency is lowered. Specifically, when the internal diameter of the introduction hole of the multi-level movable extraction pipe 182A is larger than the diameter of the low density fluid vortex 50 detected at the position near the introduction hole of the multi-level movable extraction pipe 182A, some seawater is likely to be mixed in the separated oil or gas. Conversely, when the internal diameter of the introduction hole of the multi-level movable extraction pipe 182A is smaller than the diameter of the low density fluid vortex 50 detected at the position near the introduction hole of the multi-level movable extraction pipe 182A, a portion of the separate oil or gas may be discharged outside the multi-level extraction pipe 182A, resulting in a decrease in separation efficiency.

Therefore, the present invention prevents separated oil or gas, produced through the separation method using the inline separator, from leaking or prevents seawater from remaining in separated oil or water produced through the separation method using the inline separator.

Figure 7:
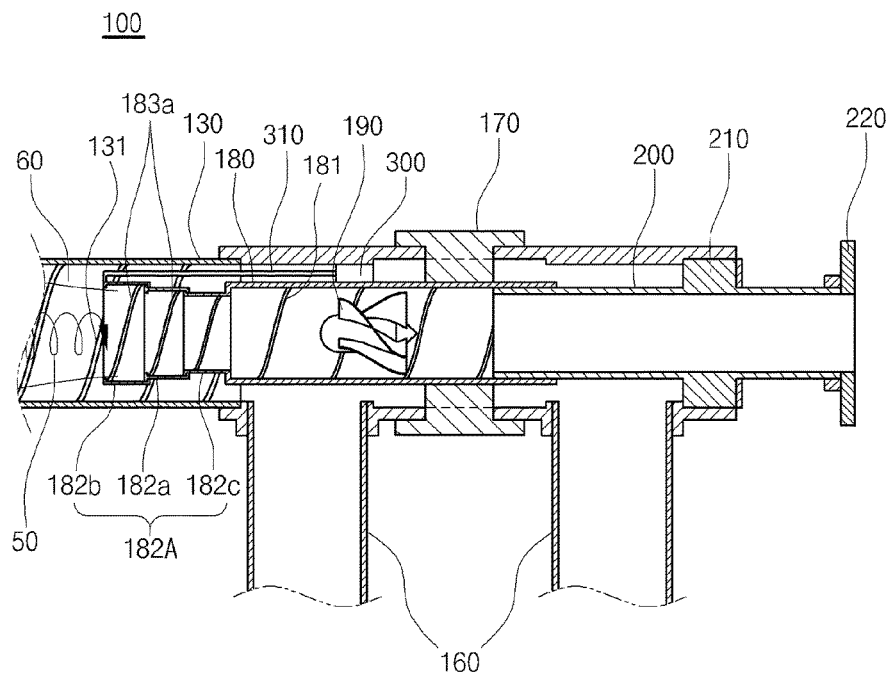
FIG. 7 is a view illustrating a state in which the diameter of a vortex of a low density fluid 50 decreases and a multi-level movable extraction pipe 182A is extended from a fixed extraction pipe 180 such that an introduction hole of the multi-level movable extraction pipe 182A is disposed at a position where an internal diameter of the introduction hole of the multi-level movable extraction pipe 182A corresponds to a diameter of the vortex of the low density fluid.
Figure 8:
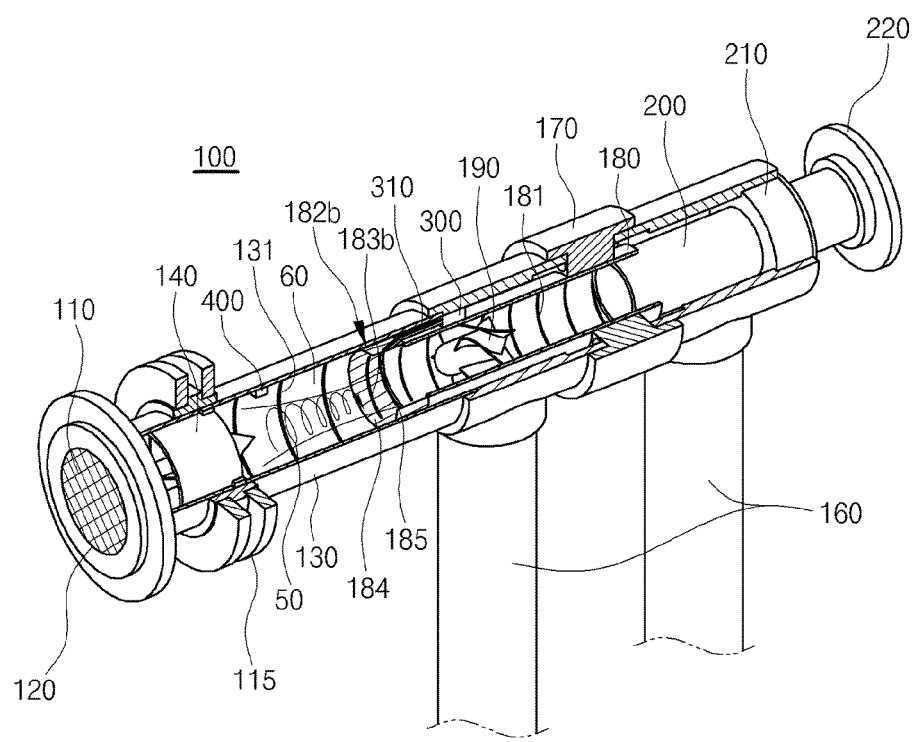
FIG. 8 is a view illustrating a state in which the diameter of the vortex of the low density fluid 50 increases and the multi-level movable extraction pipe 182A is retracted into the fixed extraction pipe 180 such that the introduction hole of the multi-level movable extraction pipe 182A is disposed at a position where the internal diameter of the introduction hole of the multi-level movable extraction pipe 182A corresponds to a diameter of the vortex of the low density fluid.
Figure 9:
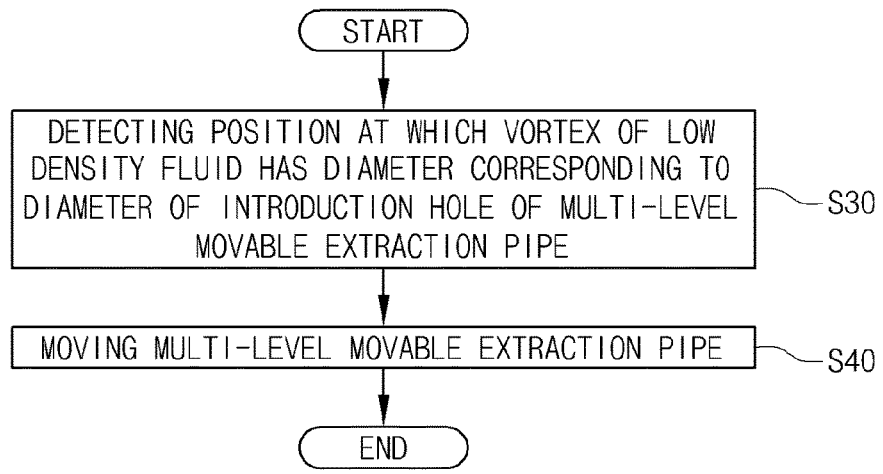
FIG. 9 is a flowchart describing a method for separating well fluid or gas-dominant fluid using the inline separator according to the second embodiment.

FIG. 7 is a view illustrating a state in which the multi-level movable extraction pipe 182A is extended from the fixed extraction pipe 180 to cope with a decreased diameter of the low density fluid vortex 50 such that the introduction hole of the multi-level movable extraction pipe 182A can be disposed at a position where the low density fluid vortex 50 has a diameter corresponding to the internal diameter of the introduction hole of the multi-level movable extraction pipe 182A. FIG. 8 is a view illustrating a state in which the multi-level movable extraction pipe 182A is retracted into the fixed extraction pipe 180 to cope with an increased diameter of the low density fluid vortex 50 such that the introduction hole of the multi-level movable extraction pipe 182A can be disposed at a position where the low density fluid vortex has a diameter corresponding to the internal diameter of the introduction hole of the multi-level movable extraction pipe 182A. FIG. 9 is a flowchart describing a method for separating well fluid or gas-dominant fluid using the inline separator according to the second embodiment.

With reference to FIGS. 7 to 9, a method for separating well fluid or gas-dominant fluid according to the present invention will be described in detail.

First, as illustrated in FIG. 7, when well fluid or gas-dominant fluid is introduced into the outer pipe 130, a vortex is formed in an upstream side of the multi-level movable extraction pipe 182A in the outer pipe 130 due to rotation of the vortex-generating rotor 140. At this point, a low density fluid, such as oil or gas, forms a low density fluid vortex 50 at the center and a high density fluid such as seawater forms a high density fluid vortex 60 outside the low density fluid vortex 50.

When the vortexes are formed as described above, the low density fluid vortex diameter detection unit 400 performs a position detection step S30 in which the low density fluid vortex diameter detection unit 400 detects a position of a portion of the low density fluid vortex 50, having a diameter corresponding to the internal diameter of the introduction hole of the multi-level movable extraction pipe 182A.

After the position detection step S30 is performed, a pipe moving step S40 is performed in which the multi-level movable extraction pipe 182A is moved such that the introduction hole of the multi-level movable extraction pipe 182A can be disposed at a position where the low density fluid vortex 50 has a diameter corresponding to the internal diameter of the introduction hole of the multi-level movable extraction pipe 182A.

When the detection results of the position detection step S30 indicate that the internal diameter of the introduction hole of the multi-level movable extraction pipe 182A is larger than the diameter of the low density fluid vortex 50 detected at the position near the introduction hole of the multi-level movable extraction pipe 182A, as illustrated in FIG. 7, the pipe moving step S40 may be a process in which the multi-level movable extraction pipe 182A is extended from the fixed extraction pipe 180. In Step S40, the pipe driving unit 400 moves the introduction hole of the multi-level movable extraction pipe toward the vortex-generating rotor 140. As a result, the introduction hole of the multi-level movable extraction pipe 182A can be disposed at a position where the low density fluid vortex has a diameter corresponding to the internal diameter of the introduction hole of the multi-level movable extraction pipe 182A.

Conversely, when the internal diameter of the introduction hole of the multi-level movable extraction pipe 182A is smaller than the diameter of the low density fluid vortex 50 detected at the position near the introduction hole of the multi-level movable extraction pipe 182A, as illustrated in FIG. 8, the pipe moving step S40 may be a process in which the multi-level movable extraction pipe 182A is retracted into the fixed extraction pipe 180. That is, in Step S40, the pipe driving unit 400 causes the introduction hole of the multi-level movable extraction to move away from the vortex-generating rotor 140. As a result, the introduction hole of the multi-level movable extraction pipe 182A can be disposed at a position where the low density fluid vortex has a diameter corresponding to the internal diameter of the introduction hole of the multi-level movable extraction pipe 182A.

Figure 10:
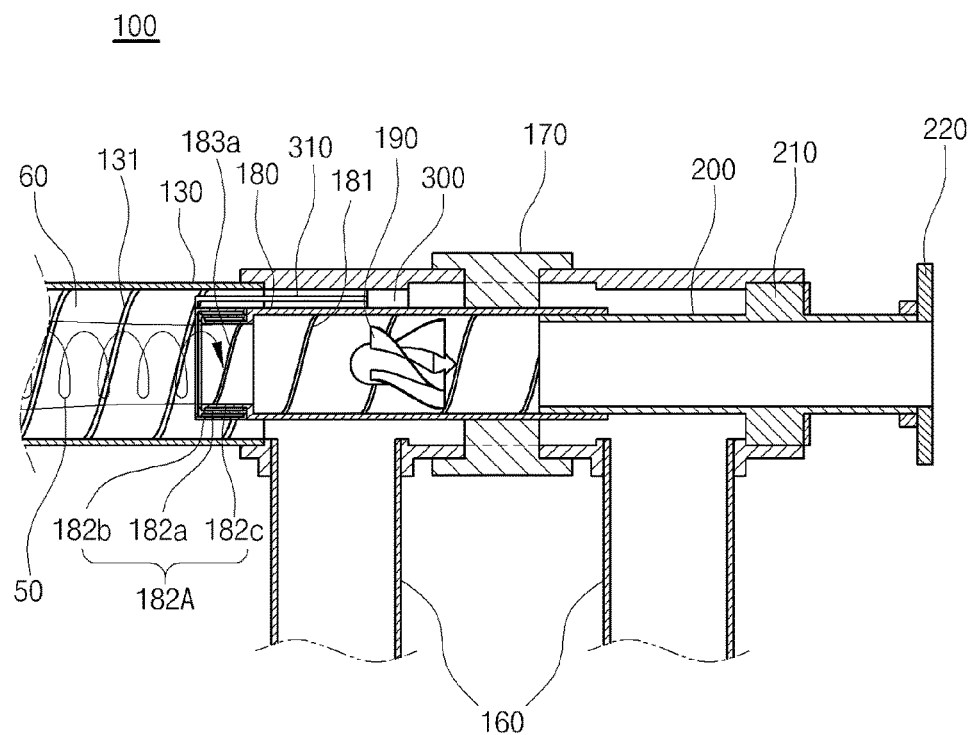
FIG. 10 is a cut-away perspective view illustrating an inline separator 100 for separating well fluid or gas-dominant fluid, equipped with a diameter-adjustable pipe, according to a third embodiment.

FIG. 10 is a cut-away perspective view illustrating an inline separator 100 for separating well fluid or gas-dominant fluid according to a third embodiment of the present invention.

As illustrated in FIG. 10, the inline separator 100 according to this embodiment includes: an outer pipe 130 provided with an inlet 120 equipped with a diffuser 110; a vortex-generating rotor 140 that is rotatably fixed by a vortex-generating rotor fixing bracket 15 in the outer pipe 130; a fixed extraction pipe 180 in which an extraction pipe rotor 190 is installed and which is fixed by an extraction pipe fixing bracket 170; a diameter-adjustable pipe 182b connected to an end of the fixed extraction pipe 180, close to the vortex-generating rotor 140; and a pressure compensation pipe 200 provided with a pressure compensator 210 and a discharge hole. The vortex-generating rotor 140, the fixed extraction pipe 180, the diameter-adjustable pipe 182a, and the pressure compensation pipe 200 are arranged in this order. A seawater discharge pipe 160 is connected to a portion of the outer pipe 130 at which the fixed extraction pipe 180 is disposed. There is a channel formed between an inner surface of the outer pipe 130 and an outer surface of the fixed extraction pipe 180 so that seawater can move through the channel.

The diffuser 110 uniformly diffuses the well fluid or gas-dominant fluid introduced into the outer pipe 130 so that a uniform vortex is formed in the outer pipe 130. The diffuser 110 may be a lattice structure such as a honeycomb structure.

The pressure compensation pipe 200 applies pressure to separated oil or gas so that the separated oil or gas can be easily transported to a storage tank in a drill ship.

The diameter-adjustable pipe 182b is rotatably hinged to an input end of the fixed extraction pipe 180 by a plurality of hinges 185 and is provided with a plurality of blades 184 that is combined with each other to form a cylinder shape. Every blade of the blades 184 is partially superimposed on a neighboring blade. The diameter of the diameter-adjustable pipe 182b can be adjusted by a pipe driving unit 300 and a driving rod 310.

In the outer pipe 130, the pipe driving unit 300 for adjusting the diameter of the introduction hole of the diameter-adjustable pipe 182b and the driving rod 310 for transferring driving force of the pipe driving unit 300 to the diameter-adjustable pipe 182b are installed.

A helical steel wire is installed on inner surfaces of the outer pipe 130, the fixed extraction pipe 180, and the diameter-adjustable pipe 182b to cause a vortex.

A portion of the helical steel wire disposed on the inner surface of the outer pipe 130 is referred to as "outer pipe steel wire" 131, a portion of the helical steel wire disposed on the inner surface of the fixed extraction pipe 180 is referred to as "fixed extraction pipe steel wire" 181, and a portion of the helical steel wire disposed on the inner surface of the diameter-adjustable pipe 182b is referred to as "diameter-adjustable pipe steel wire" 183b.

At a downstream side of the vortex-generating rotor 140 within the outer pipe 130, a low density fluid vortex diameter detection unit 400 is installed to detect a diameter of a low density fluid vortex at an entrance side of the diameter-adjustable pipe 182b. The low density fluid vortex diameter detection unit 400 is structured to move in the outer pipe 130 in a lengthwise direction of the outer pipe 130, thereby detecting diameters of the low density fluid vortex 50 having a funnel shape at different positions in the lengthwise direction and outputting the detected diameters to the pipe driving unit 300. The low density fluid vortex diameter detection unit 400 may use a mirror detection system or an ultrasonic detection system.

In the mirror detection system, a vortex of fluid causes changes in pressure applied to the surfaces of thin metallic mirrors disposed at respective sides of a vortex generator through pressure directing holes, thereby causing vibrations of the metallic mirrors. Light-emitting devices are disposed to be close to the respective vibrating mirrors, and light reflected from the vibrating mirrors is detected as a signal. The mirror detection system detects a vortex in this way.

The ultrasonic detection system continuously receives ultrasonic waves using changes in air density attributed to a vortex. This system detects the frequency of vortexes by detecting the number of signals scattered due to the density differences.

The inline separator 100 for separating well fluid or gas-dominant fluid, having the structure described above, first receives well fluid (a mixture of oil and seawater) or gas-dominant fluid (a mixture of gas and seawater) through the inlet 120 and forms a vortex by rotating the vortex-generating rotor 140. At this point, a low density fluid, such as oil or gas, forms a low density fluid vortex 50 at the center. On the other hand, a high density fluid, such as seawater, forms a high density fluid vortex 60 outside the low density fluid vortex 50 due to centrifugal force.

Therefore, the low density fluid vortex 50 is extracted through the mixed extraction pipe 180 and accelerated by the extraction pipe rotor 190 installed in the extraction pipe 180. Then, the low density fluid vortex 50 gains pressure while passing through the pressure compensating pipe 200. Next, the low density fluid vortex 50 is transferred to a gas tank or an oil tank in a drilling facility through a pipeline connected to the discharge hole 220. Thus, the low density fluid is finally stored in the gas tank or oil tank. On the other hand, the high density fluid vortex 60 is discharged through the channel between the outer pipe 130 and the fixed extraction pipe 180 and then through the seawater discharge pipe 160. In this way, oil or gas and seawater are separated.

In the process of separating well fluid or gas-dominant fluid, a diameter of the low density fluid vortex 50 and a diameter of the high density fluid vortex 60 vary in accordance with a mixing ratio of oil or gas to seawater. Therefore, when an internal diameter of the introduction hole of the diameter-adjustable pipe 182b differs from a diameter of the low density fluid vortex 50 detected at a position near the introduction hole of the diameter-adjustable pipe 182b, separation efficiency is lowered. Specifically, when the internal diameter of the introduction hole of the diameter-adjustable pipe 182b is larger than the diameter of the low density fluid vortex 50 detected at the position near the introduction hole of the diameter-adjustable pipe 182b, some seawater is likely to be mixed in separated oil or gas. Conversely, when the internal diameter of the introduction hole of the diameter-adjustable pipe 182b is smaller than the diameter of the low density fluid vortex 50 detected at the position near the introduction hole of the diameter-adjustable pipe 182b, a portion of separated oil or gas is likely to be discharged outside the diameter-adjustable pipe 182, resulting in a decrease in separation efficiency.

Therefore, an object of the present invention is to prevent oil or gas that is obtained through a separation method using an inline separator from being lost or leaking and to prevent seawater from being mixed with the oil or gas produced through the separation method.

Figure 11:
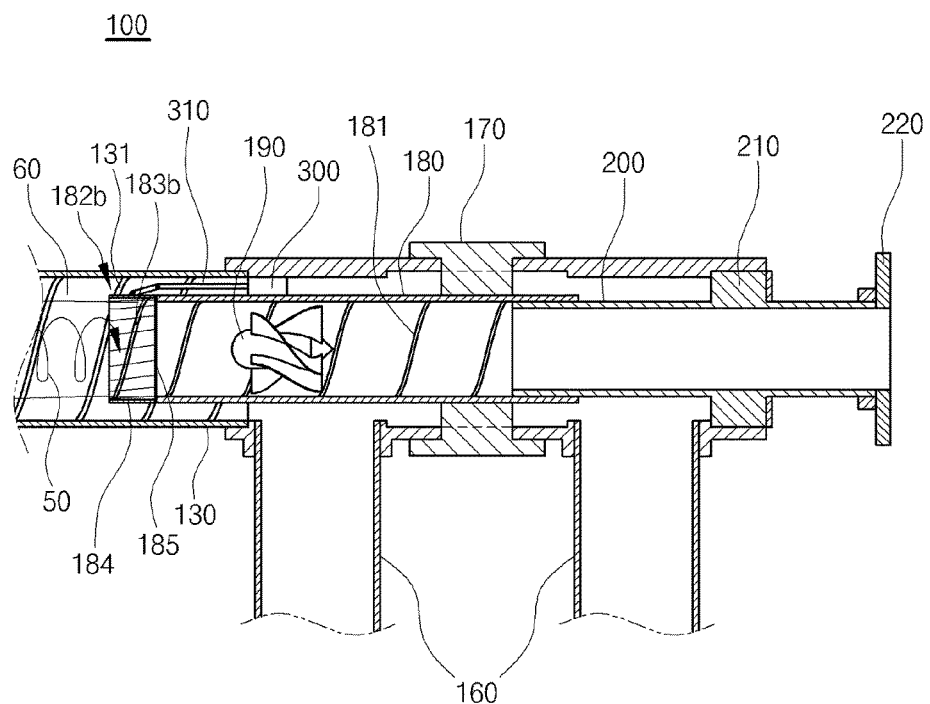
FIG. 11 is a flowchart describing a method for separating well fluid or gas-dominant fluid using the inline separator according to the third embodiment.
Figure 12:
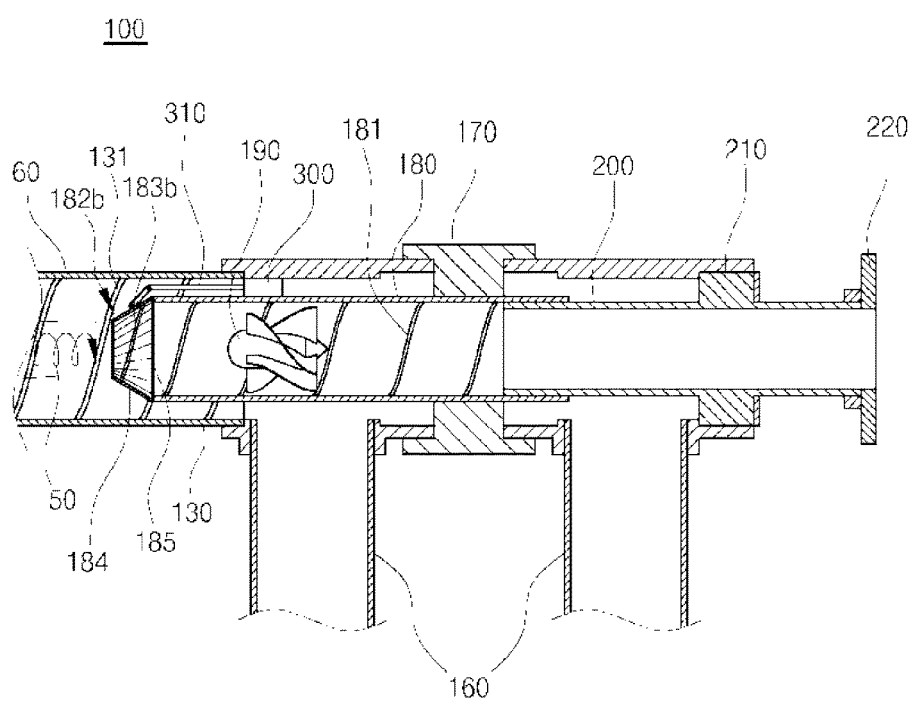
FIG. 12 is a view illustrating a state in which the diameter of a vortex of a low density fluid 50 increases and the diameter of an introduction hole of a diameter-adjustable pipe 182b is increased such that the diameter of the introduction hole corresponds to the diameter of the vortex of the low density fluid.
Figure 13:
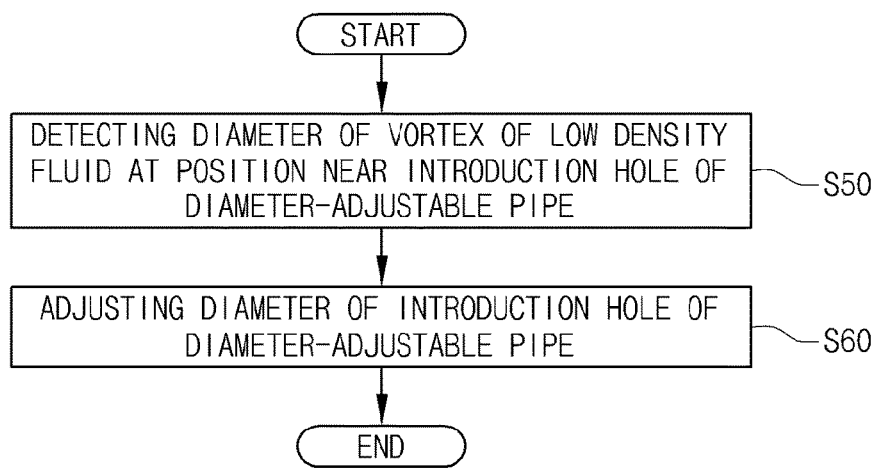
FIG. 13 is a view illustrating a state in which the diameter of the vortex of the low density fluid 50 decreases and the diameter of the introduction hole of the diameter-adjustable pipe 182b is decreased such that the diameter of the introduction hole corresponds to the diameter of the vortex of the low density fluid 50.

FIG. 11 is a view illustrating a state in which the diameter of the introduction hole of the diameter-adjustable pipe 182b is expanded to cope with an increased diameter of the low density fluid vortex 50, so that the introduction hole of the movable extraction pipe 182 may have a diameter corresponding to the diameter of the low density fluid vortex 50 detected at the position near the introduction hole of the diameter-adjustable pipe 182b. FIG. 12 is a view illustrating a state in which the introduction hole of the movable extraction pipe 182 is reduced to cope with a decreased diameter of the low density fluid vortex 50, so that the introduction hole of the movable extraction pipe 182 may have a diameter corresponding to the diameter of the low density fluid vortex 50 detected at the position near the introduction hole of the diameter-adjustable pipe 182b. FIG. 13 is a flowchart describing a method for separating well fluid or gas-dominant fluid using the inline separator according to the third embodiment of the present invention.

With reference to FIGS. 11 to 13, a method for separating well fluid or gas-dominant fluid will be described in detail.

First, as illustrated in FIG. 11, when well fluid or gas-dominant fluid is introduced into the outer pipe 130, a vortex of the incoming fluid is formed at an upstream side of the diameter-adjustable pipe 182b in the outer pipe 130 due to rotation of the vortex-generating rotor 140. At this point, a low density fluid such as oil or gas forms a low density fluid vortex 50 at the center and a high density fluid such as seawater forms a high density fluid vortex 60 outside the low density fluid vortex 50.

After the vortexes are formed as described above, the low density fluid vortex diameter detection unit 400 performs a diameter detection step S50 in which the low density fluid vortex diameter detection unit 400 detects a diameter of the low density fluid vortex 50 at a position near the introduction hole of the diameter-adjustable pipe 182b.

Next, after the diameter detection step S10 is performed, a pipe diameter adjusting step S60 is performed in which the diameter (internal diameter) of the introduction hole of the diameter-adjustable pipe 182b is adjusted to correspond to the diameter of the low density fluid vortex 50 detected at the position near the introduction hole of the diameter-adjustable pipe 182.

When the detection results of the diameter detection step S50 indicate that the diameter of the low density fluid vortex detected at the position near the introduction hole of the diameter-adjustable pipe 182b is larger than the internal diameter of the introduction hole of the diameter-adjustable pipe 182b, as illustrated in FIG. 13, the pipe diameter adjusting step S60 may be a process in which the pipe driving unit 400 expands the introduction hole of the diameter-adjustable pipe 182b such that the diameter of the introduction hole of the diameter-adjustable pipe 182b is increased to the diameter of the low density fluid vortex 50 detected at the position near the introduction hole of the diameter-adjustable pipe 182b.

Conversely, when the diameter of the low density fluid vortex detected at the position near the introduction hole of the diameter-adjustable pipe 182b is smaller than the internal diameter of the introduction hole of the diameter-adjustable pipe 182b, as illustrated in FIG. 12, the pipe diameter adjusting step S60 may be a process in which the pipe driving unit 400 reduces the introduction hole of the diameter-adjustable pipe 182b such that the diameter of the introduction hole of the diameter-adjustable pipe 182b is decreased to the diameter of the low density fluid vortex 50 detected at the position near the introduction hole of the diameter-adjustable pipe 182b.

INDUSTRIAL APPLICABILITY

The present invention can be applied to the offshore oil or gas drilling industry.

The invention claimed is:

1. An inline separator for separating well fluid or gas-dominant fluid, the inline separator comprising:
   an outer pipe provided with an inlet;
   a vortex-generating rotor installed in the outer pipe to be close to the inlet;
   a fixed extraction pipe having an external diameter smaller than an internal diameter of the outer pipe and installed in the outer pipe at downstream of the vortex-generating rotor;
   a movable extraction pipe connected to an end of the fixed extraction pipe, close to the vortex-generating rotor, and having an extendable and retractable structure such that an introduction hole of the movable extraction pipe is changeable;
   a pressure compensation pipe that applies pressure to oil or gas separated at a downstream end of the fixed extraction pipe; and
   a seawater discharge pipe connected to a portion of the outer pipe, at which the fixed extraction pipe is disposed.

2. The inline separator according to claim 1, further comprising a low density fluid vortex diameter detection unit that detects a diameter of a vortex of a low density fluid and is installed at a downstream side of the vortex-generating rotor.

3. The inline separator according to claim 2, further comprising:
   a pipe driving unit that moves the movable extraction pipe, in accordance with the diameter of the vortex of the low density fluid detected by the low density fluid vortex diameter detection unit, to a position where the vortex of the low density fluid has a diameter corresponding to the diameter of the introduction hole of the movable extraction pipe; and
   a droving rod that moves the movable extraction pipe using force supplied by the pipe driving unit.

4. The inline separator according to claim 1, further comprising an extraction pipe rotor installed in the fixed extraction pipe to enhance a vortex of separated oil or gas.

5. The inline separator according to claim 1, further comprising a steel wire installed on inner surfaces of the outer pipe, the fixed extraction pipe, and the movable extraction pipe to cause a vortex.

6. A method for separating well fluid or gas-dominant fluid, using an inline separator for separating oil or gas from the well fluid or gas-dominant fluid, wherein the inline separator includes an outer pipe in which a vortex-generating rotor and a low density fluid vortex diameter detection unit are installed, a movable extraction pipe and a fixed extraction pipe installed in the outer pipe to be spaced from an inner surface of the outer pipe, and a pipe driving unit and a driving rod for moving the movable extraction pipe, the method comprising:
   detecting a position of a portion of a vortex of a low density fluid, having a diameter corresponding to a diameter of an introduction hole of the movable extraction pipe, using the low density fluid vortex diameter detection unit, when the vortex of the low density fluid is formed in the outer pipe at an upstream side of the movable extraction pipe by the vortex-generating rotor; and moving the movable extraction pipe, using the pipe driving unit and the driving rod, to such a position that the vortex of the low density fluid has a diameter corresponding to the diameter of the introduction hole of the movable extraction pipe.

7. An inline separator for separating well fluid or gas-dominant fluid, comprising:
an outer pipe provided with an inlet;
a vortex-generating rotor installed in the outer pipe to be close to the inlet;
a fixed extraction pipe having an external diameter smaller than an internal diameter of the outer pipe and installed in the outer pipe at a downstream side of the vortex-generating rotor;
a multi-level movable extraction pipe that is extendable from and retractable into an end of the fixed extraction pipe, close to the vortex-generating rotor such that a position of an introduction hole of the multi-level movable extraction pipe is changeable;
a pressure compensation pipe that is disposed at a downstream side of the fixed extraction pipe and applies pressure to separated oil or gas to discharge the separated oil or gas outside; and
a seawater discharge pipe connected to a portion of the outer pipe at which the fixed extraction pipe is disposed.

8. The inline separator according to claim 7, further comprising a low density fluid vortex diameter detection unit that is installed at a downstream side of the vortex-generating rotor and detects a diameter of a vortex of a low density fluid.

9. The inline separator according to claim 8, further comprising:
a pipe driving unit that moves the multi-level movable extraction pipe in accordance with a diameter of the vortex of the low density fluid detected by the low density fluid vortex diameter detection unit, to such a position at the vortex of the low density fluid has a diameter corresponding to a diameter of the introduction hole of the multi-level movable extraction pipe; and
a driving rod that moves the multi-level movable extraction pipe using force supplied by the pipe driving unit.

10. The inline separator according to claim 7, further comprising an extraction pipe rotor that is installed in the fixed extraction pipe and enhances a vortex of separated oil or gas.

11. The inline separator according to claim 7, further comprising a steel wire installed on inner surfaces of the outer pipe, the fixed extraction pipe, and the multi-level movable extraction pipe to cause a vortex of fluid.

12. A method for separating well fluid or gas-dominant fluid using an inline separator for separating well fluid or gas-dominant fluid, wherein the inline separator includes an outer pipe in which a vortex-generating rotor and a low density fluid vortex diameter detection unit are installed, a multi-level movable extraction pipe installed in the outer pipe to be spaced from an inner surface of the outer pipe, a fixed extraction pipe, and a pipe driving unit and a driving rod for moving the multi-level movable extraction pipe, the method comprising:
a position detection step of detecting a position of a portion of a low density fluid vortex, having a diameter corresponding to a diameter of an introduction hole of the multi-level movable extraction pipe, using the low density fluid vortex diameter detection unit, when a vortex is formed by the vortex-generating rotor at an upstream side of the multi-level movable extraction pipe in the outer pipe; and
a multi-level movable extraction pipe moving step of moving the multi-level movable extraction pipe using the pipe driving unit and the driving rod to such a position that the vortex of the low density fluid has a diameter corresponding to the diameter of the introduction hole of the multi-level movable extraction pipe.

13. An inline separator for separating well fluid or gas-dominant fluid, comprising:
an outer pipe provided with an inlet;
a vortex-generating rotor installed in the outer pipe to be close to the inlet;
a fixed extraction pipe having an external diameter smaller than an internal diameter of the outer pipe and installed in the outer pipe at a downstream side of the vortex-generating rotor;
a diameter-adjustable pipe connected to an end of the fixed extraction pipe, closed to the vortex-generating rotor;
a pressure compensation pipe that applies pressure to oil or gas separated in a downstream portion of the fixed extraction pipe; and
a seawater discharge pipe connected to a portion of the outer pipe at a position at which the fixed extraction pipe is disposed.

14. The inline separator according to claim 13, further comprising a low density fluid vortex diameter detection unit that is installed at a downstream side of the vortex-generating rotor and detects a diameter of a vortex of a low density fluid.

15. The inline separator according to claim 14, further comprising:
a pipe driving unit that adjusts the diameter of the diameter-adjustable pipe in accordance with a diameter of the vortex of the low density fluid detected by the low density fluid vortex diameter detection unit; and
a driving rod that adjusts the diameter of the diameter-adjustable pipe using force supplied by the pipe driving unit.

16. The inline separator according to claim 13, wherein an end of the diameter-adjustable pipe is hinged to an end of the fixed extraction pipe, close to the vortex-generating rotor, and is provided with a plurality of blades that is combined with each other in a partially superimposed manner, and wherein a diameter of the end of the diameter-adjustable pipe is adjusted in such a manner that movement of one blade causes the plurality of blades to move in the same direction.

17. The inline separator according claim 13, further comprising an extraction pipe rotor that is installed in the fixed extraction pipe and enhances a vortex of separated oil or gas.

18. The inline separator according to claim 13, further comprising a steel wire installed on inner surface of the outer pipe, the fixed extraction pipe, and the diameter-adjustable pipe.

19. A method for separating well fluid or gas-dominant fluid using an inline separator for separating introduced well fluid or gas-dominant fluid into oil or gas and seawater, wherein the inline separator includes an outer pipe in which a vortex-generating rotor and a low density fluid vortex diameter detection unit are installed, a diameter-adjustable pipe installed in the outer pipe to be spaced from an inner surface of the outer pipe, a fixed extraction pipe, and a pipe driving unit and a driving rod for adjusting a diameter of the diameter-adjustable pipe, the method comprising:
- detecting a diameter of a vortex of a low density fluid vortex at a position near an introduction hole of the diameter-adjustable pipe, using the low density fluid vortex diameter detection unit, when a vortex is formed at an upstream side of the diameter-adjustable pipe in the outer pipe by the vortex-generating rotor; and
- adjusting the diameter of the introduction hole of the diameter-adjustable pipe using the pipe driving unit and the driving rod such that the diameter of the introduction hole of the diameter-adjustable pipe corresponds to the detected diameter of the vortex of the low density fluid.

* * * * *